UNITED STATES PATENT OFFICE.

EDWIN C. WEISGERBER, OF THE UNITED STATES ARMY.

COLORED SMOKE.

1,339,143. Specification of Letters Patent. Patented May 4, 1920.

No Drawing. Application filed January 10, 1919. Serial No. 270,572.

(FILED UNDER THE ACT OF MARCH 3, 1883, 22 STAT. L., 625.)

*To all whom it may concern:*

Be it known that I, EDWIN C. WEISGERBER, captain, Corps of Eng., U. S. A., a citizen of the United States, stationed at Washington, D. C., have invented an Improvement in Colored Smoke, of which the following is a specification.

The invention described herein may be used by the Government, or any of its officers or employees in prosecution of work for the Government, or by any other person in the United States, without payment of any royalty thereon.

This invention relates to colored smoke, for military and other purposes, and has particular relation to a smoke colored violet.

The smoke producing composition comprises the following, in substantially the proportions given.

30 parts potassium chlorate,
20 parts lactose,
20 parts iodin.

Each of the ingredients is ground to powder separately, so that they can be bolted through ordinary bolting cloth, and then they are thoroughly mixed by pouring from one receptacle to another.

What I claim as my invention is:

1. A colored smoke producing composition comprising potassium chlorate, lactose and iodin.

2. A colored smoke producing composition comprising in substantially the proportions following:

Potassium chlorate_____ 30 parts.
Lactose _____ 20 parts.
Iodin _____ 20 parts.

EDWIN C. WEISGERBER.